United States Patent
Buday

(10) Patent No.: US 7,355,142 B2
(45) Date of Patent: Apr. 8, 2008

(54) RESISTANCE WELDING ELECTRODE, WELDED COPPER FLEX LEAD, AND METHOD FOR MAKING SAME

(75) Inventor: Jeremie M. Buday, Lakewood, OH (US)

(73) Assignee: Lincoln Global, Inc., City of Industry, CA (US)

( * ) Notice: Subject to any disclaimer, the term of this patent is extended or adjusted under 35 U.S.C. 154(b) by 21 days.

(21) Appl. No.: 11/112,779

(22) Filed: Apr. 22, 2005

(65) Prior Publication Data

US 2006/0237396 A1 Oct. 26, 2006

(51) Int. Cl.
*B23K 11/30* (2006.01)
(52) U.S. Cl. .................................... 219/119
(58) Field of Classification Search ............. 219/117, 219/119, 120
See application file for complete search history.

(56) References Cited

U.S. PATENT DOCUMENTS

| | | | |
|---|---|---|---|
| 1,303,919 A | * | 5/1919 | Lachman .................. 219/119 |
| 3,037,108 A | * | 5/1962 | Poillevey .................. 219/56 |
| 3,666,912 A | * | 5/1972 | Anderson et al. ......... 219/78.02 |
| 4,400,608 A | * | 8/1983 | Wagatsuma et al. ...... 219/107 |
| 4,471,334 A | | 9/1984 | Watanabe et al. |
| 4,543,462 A | * | 9/1985 | Rossell .................... 219/91.21 |
| 4,694,241 A | | 9/1987 | Genuit |
| 5,021,627 A | * | 6/1991 | Bersch et al. ............. 219/119 |
| 5,289,110 A | | 2/1994 | Slevinsky |
| 5,304,769 A | * | 4/1994 | Ikegami et al. ........... 219/119 |
| 5,541,384 A | | 7/1996 | Tsuzuki et al. |
| 5,977,505 A | | 11/1999 | Kobayashi et al. |
| 6,047,471 A | | 4/2000 | Nippert et al. |
| 6,078,148 A | | 6/2000 | Hochstein |
| 6,225,591 B1 | | 5/2001 | Nippert et al. |
| 6,403,913 B1 | | 6/2002 | Spinella et al. |
| 6,472,851 B2 | | 10/2002 | Hammond |
| 2004/0088857 A1 | | 5/2004 | Fujimoto et al. |

* cited by examiner

*Primary Examiner*—Kevin P. Kerns
(74) *Attorney, Agent, or Firm*—Fay Sharpe LLP

(57) ABSTRACT

A method and an electrode for welding a stranded metal workpiece to a substrate workpiece using electrical-resistance welding is provided and a weldment article of manufacture made thereby. More particularly, the method and electrode are best suited for welding a stranded copper lead wire to an aluminum substrate and the weldment article of manufacture made thereby is desired.

5 Claims, 4 Drawing Sheets

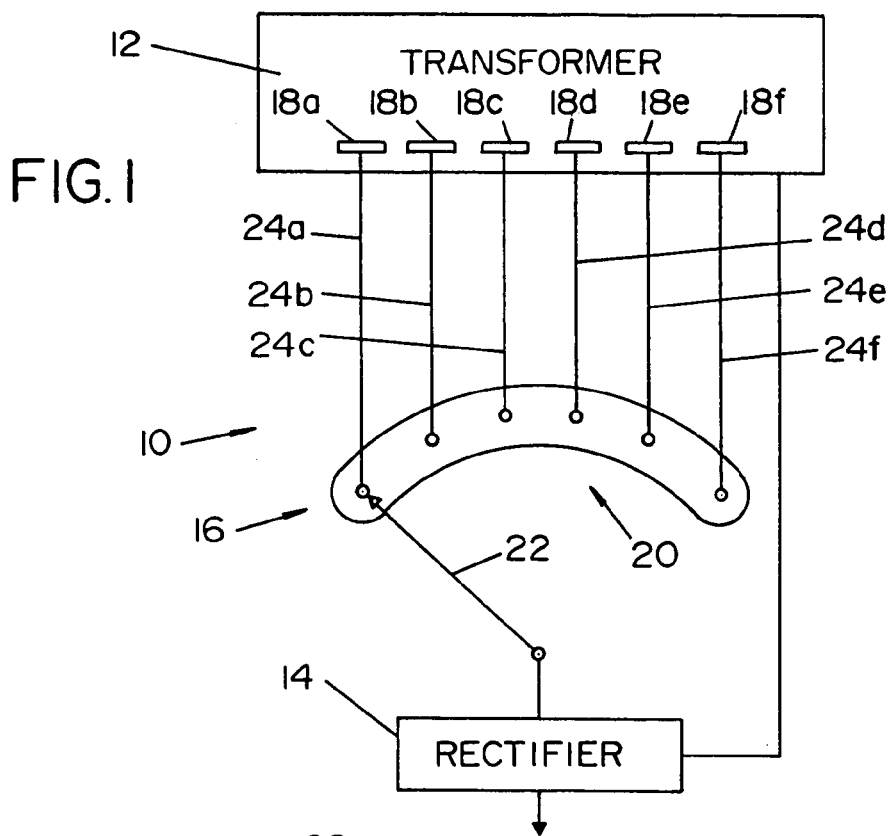
FIG. 1
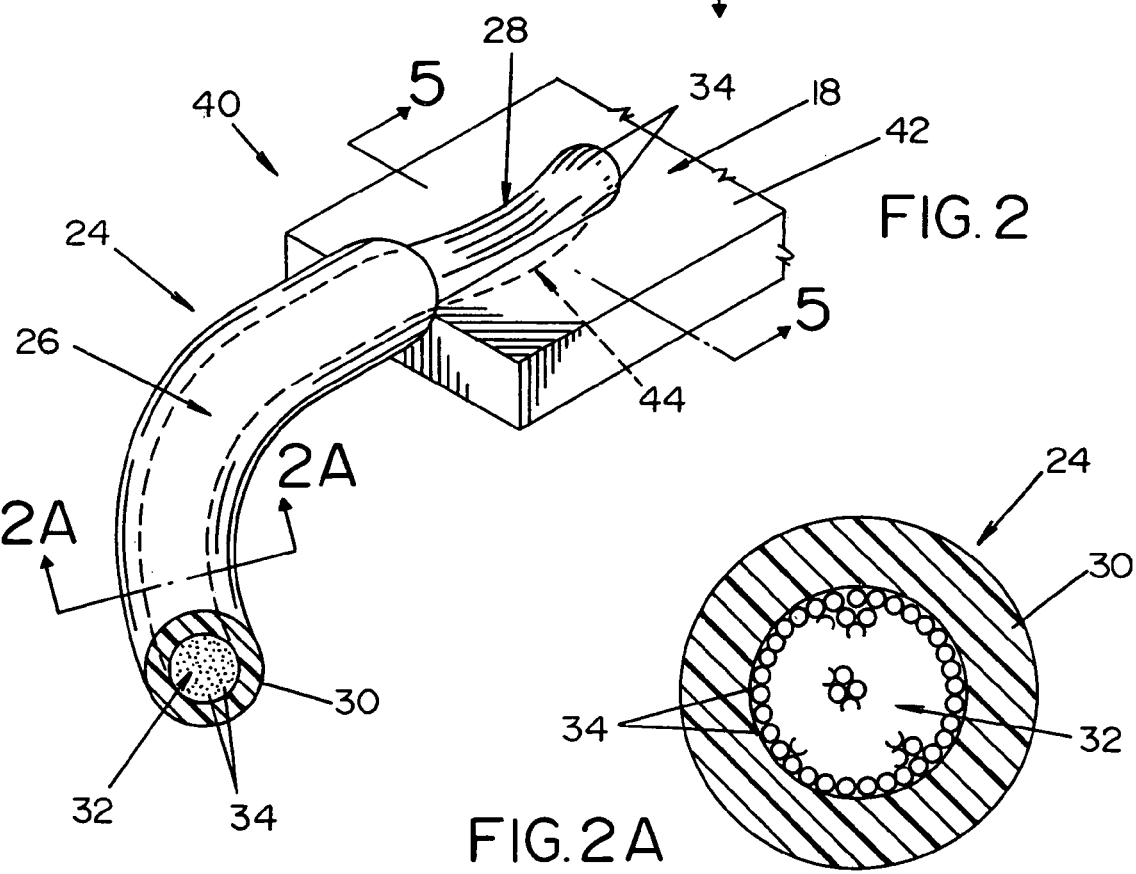
FIG. 2
FIG. 2A

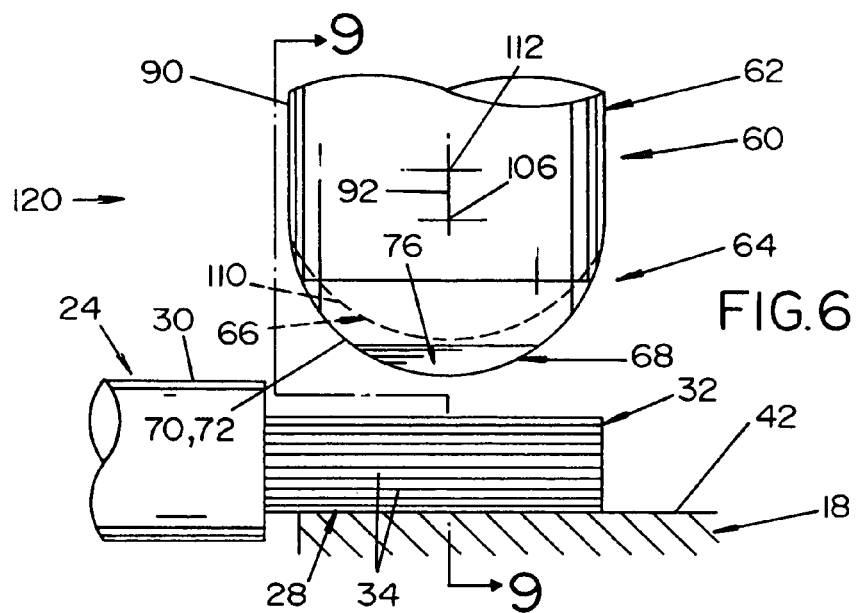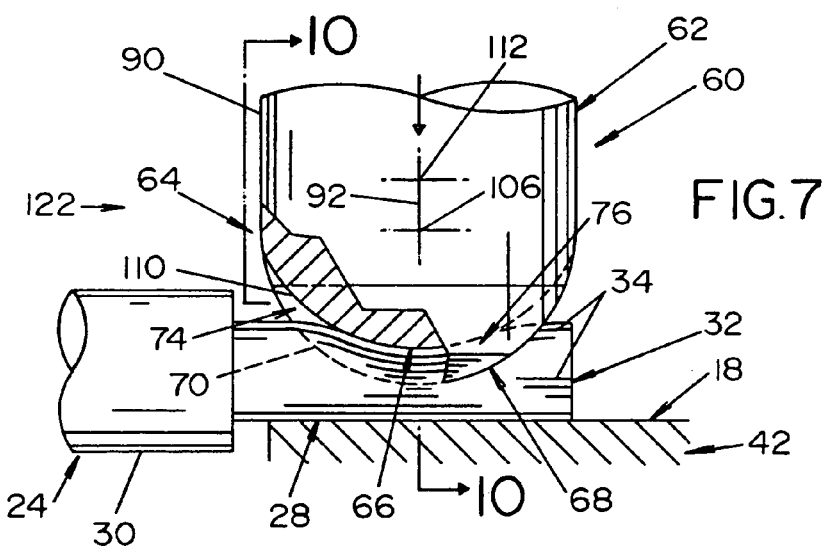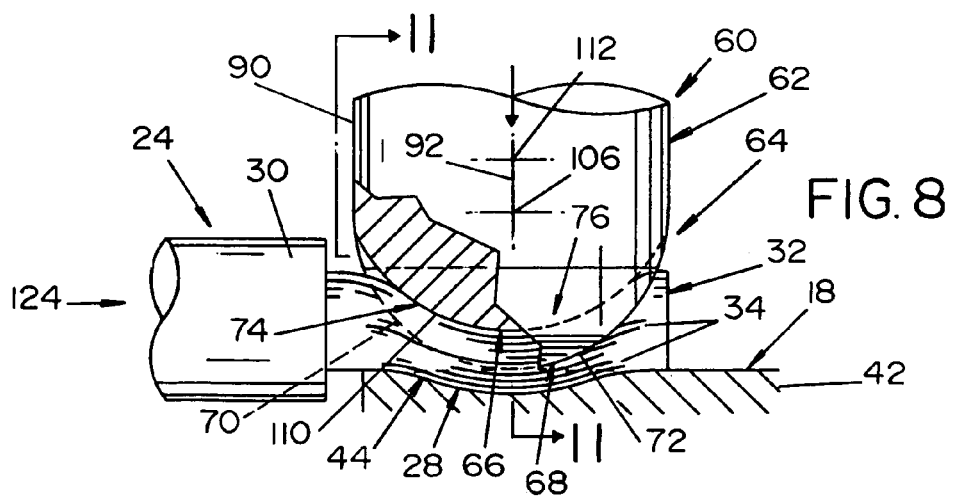

RESISTANCE WELDING ELECTRODE, WELDED COPPER FLEX LEAD, AND METHOD FOR MAKING SAME

BACKGROUND OF THE INVENTION

The present invention relates generally to a method and an electrode for welding a stranded metal workpiece to a metal substrate workpiece using electrical-resistance welding and to a weldment article of manufacture made thereby. More particularly, the invention relates to a method and electrode for welding a stranded copper lead wire to an aluminum substrate of an electrical connection such as, for example, a transformer tap, and to the weldment article of manufacture made thereby. It is to be appreciated, however, that the invention has broader application and, in that regard, is applicable to welds and welding of any selected metal stranded workpieces to metal substrate workpieces for use in electrical, mechanical or any other connections.

For aiding in understanding of the present invention and an application thereof, reference is made first to FIGS. 1 and 3 which show an application particularly well suited for use of the present invention and to an electrical connection formed in accordance with the prior art, respectively. FIG. 1 is an illustrative schematic view showing a typical industrial power supply 10 of the type including a multi-tap transformer 12 connected with a rectifier 14 through an intermediary electrical connection network 16. In systems of the type illustrated, it is desirable to provide the rectifier 14 with various voltage levels which are readily derived from multiple taps 18a-18f of the transformer 12. A switch device 20 includes a wiper arm 22 of the other switch means which may be moved into selected positions for connecting the rectifier 14 to individual transformer taps 18a-18f at various voltage levels through intermediary lead wires 24a-24f.

Of particular relevance to the present application, however, the lead wires 24a-24f are typically stranded copper lead wires and the plurality of transformer taps 18a-18f are typically provided in the form of individual aluminum substrate members. More particularly, with reference to FIG. 2, a single lead wire 24 includes a jacketed portion 26 and a stripped portion 28 attached with an aluminum substrate transformer tap 18 in accordance with the present application. FIG. 2A shows a cross-sectional schematic view of a typical lead wire 24 which includes an outer insulative sheath 30 surrounding an inner stranded core 32 formed of a plurality of individual conductive copper strands 34.

In accordance with the prior art, connections between copper flex leads 24 and aluminum transformer tabs 18 were made using a soldering technique. As best shown in FIG. 3, the individual copper strands 34 of the stranded core 32 were soldered to the aluminum substrate 18 typically utilizing a cadmium/zinc alloy solder 38. One problem with the prior art soldering process, however, is that it requires the flex leads to be tinned before the solder is applied. To that end, corrosive fluxes must be used in order to prepare the mating surfaces. Oftentimes, water is needed to cool the connection after the soldering process. The tinning and cooling steps are time consuming. Still further, the prior art soldering process illustrated in FIG. 3 is highly dependent on human technicians which adversely affects the consistency of the connections.

Resistance spot welding is widely used in many automated processes as an alternative to soldering for joining steel and other materials, particularly in the assembly of automobile bodies, consumer products, and the like. An apparatus for resistance spot welding includes at least one resistance welding electrode which is pressed against a pair of superposed workpieces whereupon an electric current is applied thereto. With the electrodes placed against opposing sides of the workpieces to be welded, the electric current is passed through the electrode and the workpieces. The electrical resistance of the metal workpieces produces localized heating which causes the workpieces to fuse at the weld site. The electrical heating at the point of pressure of the electrode forms a molten nugget at the interface between the workpieces. The nugget freezes after the electrical current is removed.

Electrodes are typically made from copper or copper alloys to provide low electrical resistivity and allow high current flow therethrough. The tip of the electrode in contact with the workpiece typically has a geometrical configuration which is determined by the particular needs of the welding process. In most applications, the steel workpieces are somewhat forgiving in nature and the shape of the electrode, pressure applied between workpieces, and current applied thereto are parameters easily selectable to provide suitable results.

However, heretofore, electrical resistance welding has not been used to join a stranded copper workpiece with an aluminum substrate workpiece, primarily because of difficulties in properties exhibited by aluminum during phase transition. Parameters such as contact pressure, current intensity and duration, and electrode tip configuration needed to produce desired results have eluded those skilled in the welding arts.

In accordance with the above, therefore, there is a need in the art for a welding method and an electrode apparatus for welding a stranded metal workpiece to a substrate metal workpiece using electrical-resistance welding techniques, and to a weldment article of manufacture made thereby. More particularly, there is a need for a method and electrode for welding a stranded copper lead wire to an aluminum substrate and to the weldment article of manufacture made thereby.

SUMMARY OF THE INVENTION

In accordance with one aspect of the present invention, an electrode is provided for use during resistance welding of a first stranded metal workpiece to a second metal substrate workpiece. The workpieces are resistance welded by first pressing the workpieces together using the electrode and then applying an electric current to superposed regions of the workpieces through the electrode. The electrical heating at the point of pressure between the workpieces under the electrode forms a molten nugget for bonding the workpieces together. The preferred electrode includes a copper main body and a molybdenum tip portion on the main body defining a first contact region for pressed engagement with the first workpiece as the electric current is applied to superposed regions of the first and second workpieces during a welding operation. The tip portion further includes a locating region for locating the first stranded metal workpiece at the first contact region during the welding operation.

In accordance with another aspect of the present application, a method of resistance welding a stranded metal workpiece to a metal substrate workpiece is provided. The method includes providing a resistance welding electrode and, using the electrode, pressing superposed regions of the stranded metal workpiece and the metal substrate workpiece together. Thereafter, an electric current is applied to the pressed superposed regions of the stranded metal workpiece and the metal substrate workpiece sufficient to cause a first volume of the metal substrate workpiece to melt and wick into the stranded metal workpiece.

In accordance with a further limited aspect of the method of the present application, a stranded copper workpiece is resistance welded to an aluminum substrate workpiece by pressing the stranded copper workpiece onto the aluminum substrate workpiece and applying an electric current thereto sufficient to cause the aluminum substrate workpiece to melt and wick into the stranded copper workpiece.

Still further in accordance with another aspect of the present application, a weldment article of manufacture is provided including a first stranded metal workpiece and a second metal substrate workpiece attached with the first stranded metal workpiece. A portion of the second metal substrate workpiece is intermingled with individual strands of the first stranded metal workpiece. In its preferred form, the weldment article of manufacture includes a stranded copper workpiece attached with an aluminum substrate workpiece.

BRIEF DESCRIPTION OF THE DRAWINGS

FIG. 1 is an illustrative schematic view showing a typical power supply having a multi-tap transformer with various electrical connections;

FIG. 2 is a perspective view showing a finished weld of a stranded copper workpiece to an aluminum substrate workpiece in accordance with the present application;

FIG. 2A is a schematic view in cross-section taken along line 2A-2A of FIG. 2 showing a stranded copper workpiece;

FIG. 6 is a side elevational view showing an initial step in a resistance welding process in accordance with the present application;

FIG. 7 is a side elevational view showing an intermediate step in a resistance welding process in accordance with the present application;

FIG. 8 is a side elevational view showing a final step in a resistance welding process in accordance with the present application;

DETAILED DESCRIPTION

Figure 3:
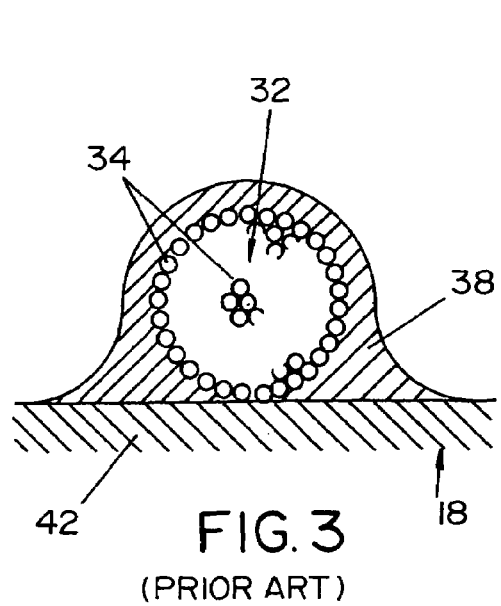
FIG. 3 is schematic view in cross-section showing a finished connection of a stranded copper workpiece to an aluminum substrate workpiece in accordance with the prior art.
Figure 4:
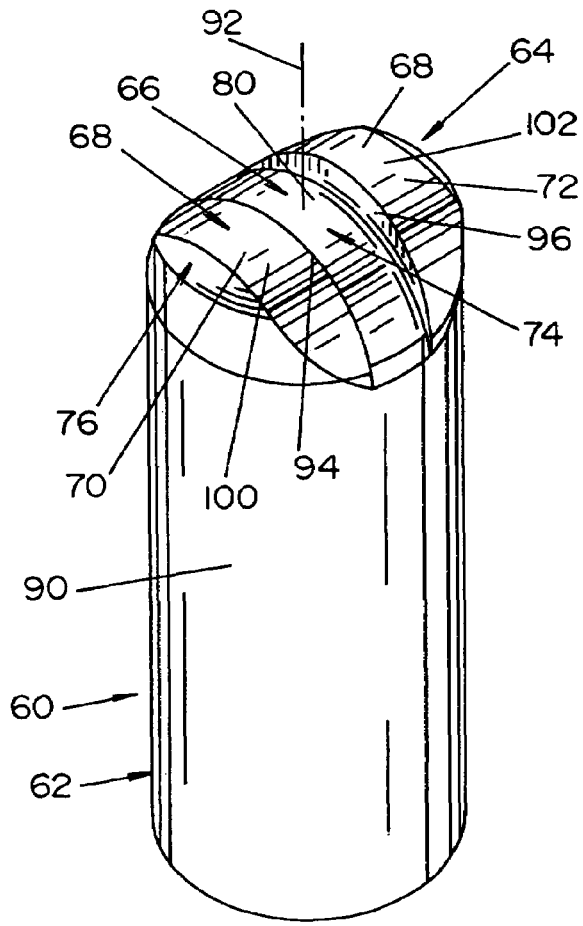
FIG. 4 is a perspective view showing a resistance welding electrode formed in accordance with the preferred embodiment of the present application.

Turning now to the drawings wherein the showings are for purposes of illustrating the preferred embodiments of the invention only and not for purposes of limiting same, FIG. 2 is a perspective view showing a finished weldment 40 article of manufacture in accordance with the present application made using the resistance welding electrode 60 shown in FIG. 4. The electrode 60 is applied during a resistance welding process in accordance with an aspect of the invention in a manner to be described in greater detail below.

As shown in FIG. 2, the preferred weldment 40 includes an electromechanical connection of a stranded lead wire 24 with a metal substrate 18. As shown in FIG. 2A, the lead wire 24 includes a plurality of individual copper strands 34 forming a stranded copper core 32 surrounded by an outer insulative sheath 30. A first portion 28 of the lead wire 24 is stripped as best illustrated in FIG. 2 so that a resistance welding process according to the teachings of this application can be applied using the electrode of FIG. 4.

Figure 5:
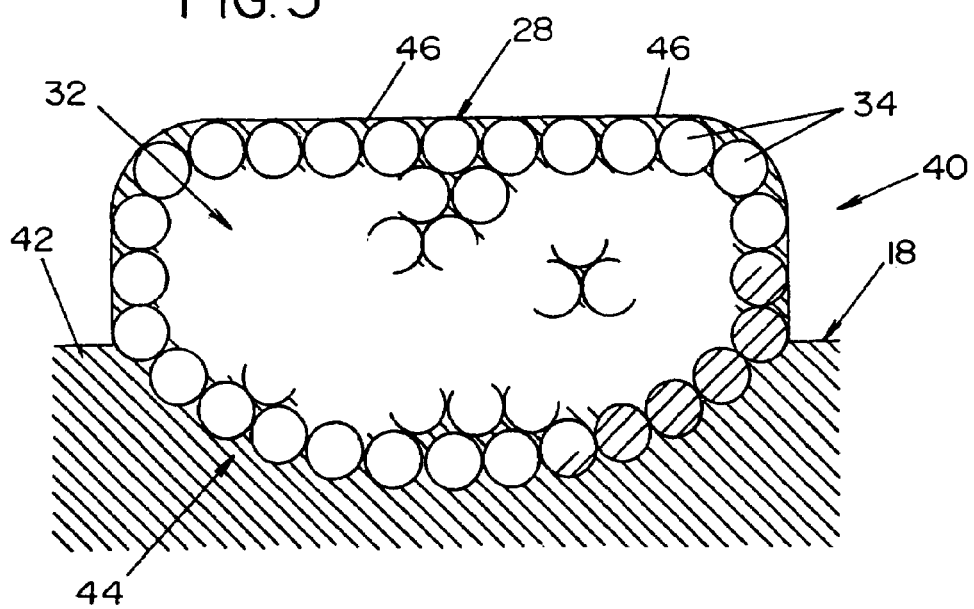
FIG. 5 is a schematic view in cross-section taken along line 5-5 of FIG. 2 showing a finished weld of a stranded copper workpiece to an aluminum substrate workpiece in accordance with the preferred embodiment of the present application.

FIG. 5 is a cross-sectional view of the weldment 40 of the preferred embodiment shown in FIG. 2 taken along line 5-5. It is to be appreciated from that figure that the weldment article of manufacture includes a first stranded metal workpiece 24, preferably in the form of a stranded copper core 32 including a plurality of individual copper strands 34 connected with a second metal substrate workpiece 18 as illustrated. In its preferred form, the second metal substrate 18 of the weldment 40 is an aluminum substrate 42 which defines a first channel region 44 formed during the resistance welding process of the present application to be described in greater detail below. The first channel region 44 is adapted to receive the stranded core 32 of the copper lead wires 24.

With continued reference to FIG. 5, it is to be appreciated that a first portion 46 of the aluminum substrate 42 is intermingled with individual copper strands 34 of the lead wire 24. In the cross-sectional view of the weldment 40 illustrated in FIG. 5, the first portion 46 of the aluminum substrate 42 becomes frozen relative to the individual copper strands 34 a short time after the current applied during the resistance welding process is removed. More particularly, the electrode 60 shown in FIG. 4 is pressed against the stripped portion 28 of the lead wire 24 while an electric current is applied thereto causing the workpieces to heat and melt the first portion 46 of the aluminum substrate 42 which is in turn wicked into the spaces between the copper strands 34 using a capillary action.

Turning now to FIG. 4, the preferred electrode 60 for use during the resistance welding process of the present invention is illustrated. As shown there, the electrode 60 includes a main body 62 preferably formed of a copper material and a tip portion 64, preferably formed of a molybdenum material. The tip portion defines a first contact region 66 adapted for pressed engagement with the first stranded metal workpiece 24 as an electric current is applied to superposed regions of the workpieces during the resistance welding operation. Further, the tip portion 64 includes a locating region 68 for locating the first stranded metal workpiece 18 at the first contact region 66 during the welding operation. In its preferred form, the locating region 68 includes a pair of shoulder members 70, 72 spaced apart by a gap 74 formed therebetween. The shoulder members 70, 72 define a distal end 76 of the electrode 60.

With continued reference to FIG. 4, the first contact region 66 is defined by a first surface 80 located in the gap 74 and spaced from the distal end 76 by a predetermined distance. It is to be appreciated that the size of the gap 74 and the distance between the distal end 76 and first surface 80 are selected based at least in part on the dimensions or size of the stranded workpiece to be welded to the substrate. The dimensions are selected to cause the stranded workpiece to be welded to the substrate in a manner described below.

Overall, the main body 62 of the subject electrode 60 defines an elongate cylindrical main body 90 defining a longitudinal axis 92. The pair of shoulder members 70, 72 define a set of opposed containment surfaces 94, 96 best illustrated in FIG. 9. As illustrated, in their preferred form, the opposed containment surfaces 94, 96 are oriented substantially in parallel with the longitudinal axis 92 defined by the cylindrical main body 90. The containment surfaces 94, 96 are used to locate and contain the plurality of copper strands 34 within the gap 74 and adjacent the first contact region 66 during a resistance welding process.

FIG. 4 best illustrates a set of curved surfaces 100, 102 defined by the pair of shoulder members 70, 72 defining a rounded distal end 76 of the subject electrode 60. The curved surfaces 100, 102 form a second contact region 104, shown in FIGS. 9-11, adapted to establish substantially a line contact with the second metal substrate workpiece 18 at a conclusion of the resistance welding operation as best illustrated in FIG. 11. Preferably, the curved surfaces 100, 102 of the pair of shoulder members 70, 72 are curved about an axis 106, shown in FIGS. 6-8, substantially perpendicular to the longitudinal axis 92 defined by the cylindrical main body 90. Similarly, the first surface 80 of the first contact region 66 defines an arcuate surface 110 curved about a second axis 112, shown in FIGS. 6-8 extending substantially in parallel with the axis 106 of the second contact region 104 and substantially perpendicular with the longitudinal axis 92 defined by the cylindrical main body.

Figure 9:
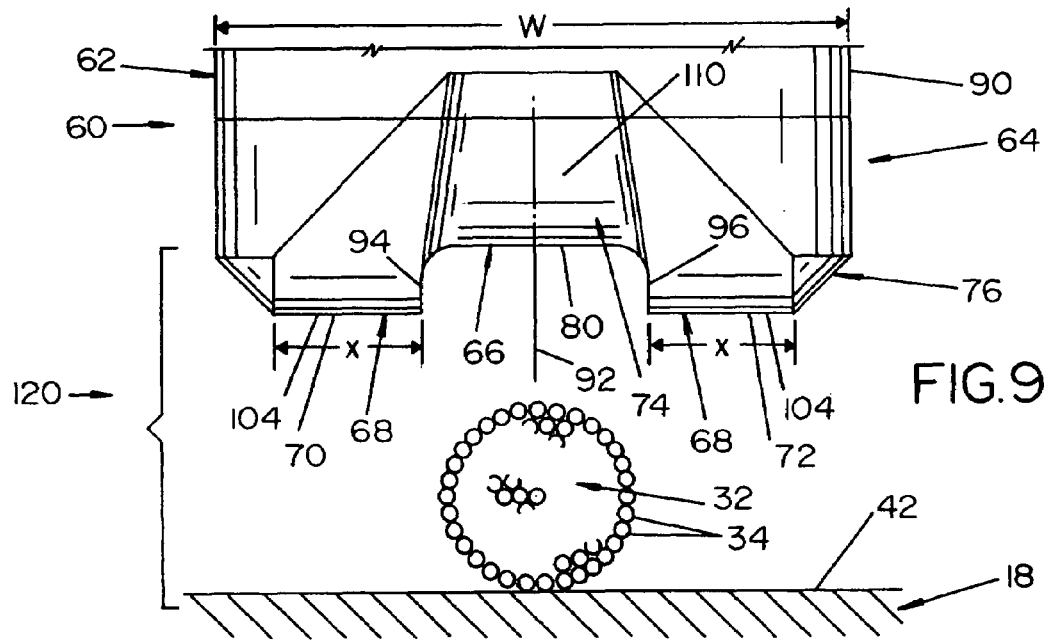
FIG. 9 is a front elevational view in partial cross-section of the initial welding step taken along view line 9-9 of FIG. 6.
Figure 10:
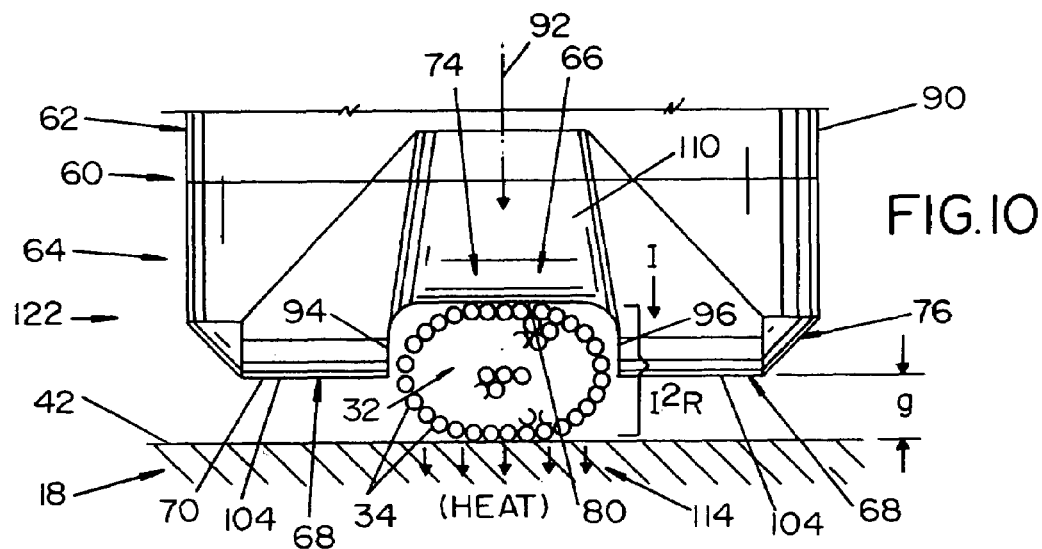
FIG. 10 is a front elevational view in partial cross-section of the intermediate welding step taken along view line 10-10 of FIG. 7; and, FIG. 11 is a front elevational view in partial cross-section of the final welding step taken along view line 11-11 of FIG. 8.
Figure 11:
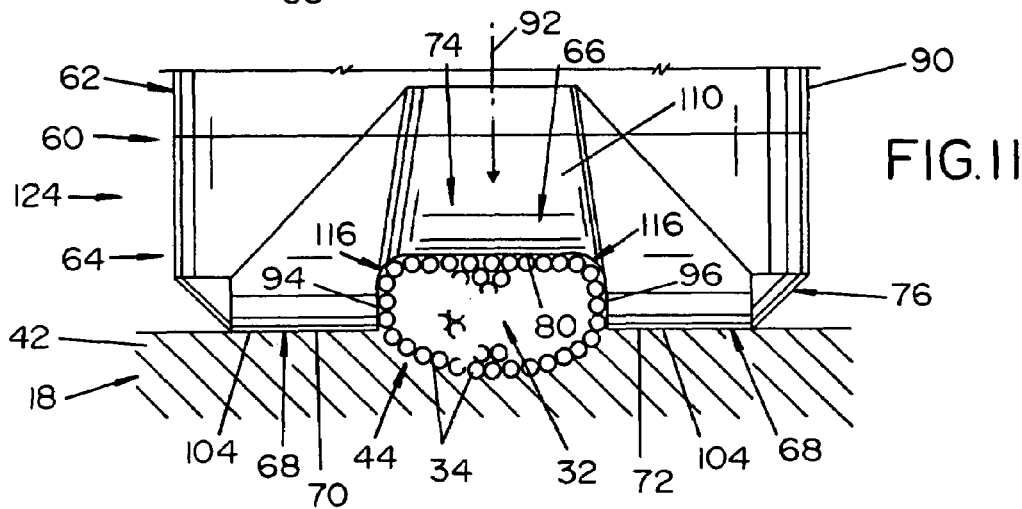

As best illustrated in FIGS. 9-11, the main body 62 has a first width w in the direction perpendicular to the longitudinal axis 92. Similarly, each of the second contact regions 104 on the lower end of the electrode 60 has a width x in the direction perpendicular to the longitudinal axis 92 of approximately less than half of the first width w of the main body portion 62. In one preferred form of the subject electrode 60, the width of the main body w is about 0.62 inches and the second width x of each of the second contact regions 104 is about 0.150 inches.

FIGS. 6-11 show steps in a method of resistance welding of a copper stranded workpiece to an aluminum substrate in accordance with the preferred embodiment of the present application. With regard first to FIGS. 6 and 9, the electrode 60 is illustrated in a position spaced from the superposed workpieces, particularly the stranded core 32 of a lead wire 24 and the aluminum substrate 42 of a transformer connection 18. FIG. 9 is a schematic plan view of an initial position 120 of the electrode 60 relative to the workpieces taken along 9-9 of FIG. 6. As illustrated, the electrode 60 is initially positioned so that the gap 74 is substantially centered about the stranded core 34 of the lead wire 24. The stranded core 32 is placed in direct contact with the underlying aluminum substrate 42 of the connection substrate 18.

Next, in FIGS. 7 and 10, the electrode 60 is brought into contact in an intermediate position 122 for pressing the stranded core workpiece 32 against the underlying aluminum substrate workpiece 42. In the intermediate position 122 shown in FIGS. 10 and 7, the plurality of individual copper strands 34 are squeezed by the first surface 80 of the first contact region 66 of the electrode 60. Preferably, the stranded core 32 is slightly flattened in the manner best shown in FIG. 10 under the compressive force of the stranded core 32 held between the first surface 80 and the aluminum substrate 42. An electric current is applied to the workpieces through the electrode 60 causing the underlying aluminum substrate 42 to heat, particularly in a first region 114 directly under the copper strands 34. Sufficient current is applied to the workpieces under controlled conditions and using techniques known in the art in order to cause the first region 114 of the aluminum substrate 42 to melt and wick into the stranded core 32 between individual copper strands 34 thereof by a capillary action.

In FIGS. 8 and 11, the electrode is illustrated in a final position 124 relative to the workpieces. As illustrated, each of the second contact regions 104 of the tip portion 64 of the electrode 60 establish substantially a line contact with the underlying aluminum substrate 42. At that time, electric current is removed from the system allowing melted portions 116 of the first region 114 to freeze in place intermingled with the individual copper strands 34 of the stranded core 32. Line contact is preferred over flat bulky contact to help prevent random spots etc. from forming on the weld joint. It is to be appreciated that the opposed containment surfaces 94, 96 formed on opposite sides of the gap 74 by the pair of shoulder members 70, 72 advantageously locate the copper strands 34 adjacent the first contact region 66 and prevent the strands from migration from under the electrode during the resistance welding process.

As noted above, the main body 62 of the electrode 60 is preferably formed of a copper material and the tip portion 64 is formed of molybdenum material. Copper in the main body portion is advantageous because the high conductivity characteristic of copper helps minimize the losses in the body during the welding process. The molybdenum in the tip portion provides an interface of dissimilar metals between the copper electrode body and the copper stranded wire workpiece. Also, the molybdenum tip is useful with the copper stranded wire workpiece to increase the overall resistance/heat of the system during the welding process.

The invention has been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An electrode for use during resistance welding of a first associated stranded metal workpiece to a second associated metal substrate workpiece by pressing and applying an electric current to superposed regions of the first and second workpieces, the electrode comprising:
   a main body; and,
   a tip portion on the main body, the tip portion defining i) a first contact region for pressed engagement with the first stranded metal workpiece as the electric current is applied to the superposed regions of the first and second workpieces during a welding operation and ii) a locating region for locating the first stranded metal workpiece at the first contact region during said welding operation, the locating region including a pair of spaced apart shoulder members having curved surfaces and defining a distal end of the electrode and forming a second contact region configured to establish substantially a line contact with said second associated metal substrate workpiece at a conclusion of said welding operation;
   wherein said pair of shoulder members are spaced apart by a gap; and, said first contact region is defined by a first surface of said tip portion located in said gap and spaced from said distal end of the electrode by a first predetermined distance;
   wherein said main body is an elongate cylindrical main body defining a longitudinal axis; and, said pair of shoulder members define a set of opposed containment surfaces oriented substantially in parallel with said longitudinal axis;

wherein said curved surfaces of said pair of shoulder members are curved about a first axis substantially perpendicular to said longitudinal axis of the main body;

wherein said first surface of the tip portion is a first arcuate surface curved about a second axis substantially parallel with the first axis defined by the curved surfaces of said pair of shoulder members and perpendicular with the longitudinal axis of the main body; and wherein:

said main body has a first width in a direction perpendicular to said longitudinal axis; and, each of said second contact regions of the pair of shoulder members has a second width in said direction perpendicular to said longitudinal axis of less than half of said first width of said main body.

2. The electrode according to claim 1 wherein:

the first width of the main body is about 0.625 inches; and, the second width of each of the second contact regions is about 0.150 inches.

3. The electrode according to claim 1 wherein:

said main body is formed of a copper material; and, said tip portion is formed of a molybdenum material.

4. The electrode according to claim 1 wherein:

said pair of shoulder members each lie substantially in a plane passing through said longitudinal axis of the main body.

5. The electrode according to claim 4 wherein:

said pair of shoulder members each lie substantially in a single common plane passing through said longitudinal axis of the main body.

* * * * *